US009698433B2

(12) United States Patent
Goto et al.

(10) Patent No.: US 9,698,433 B2
(45) Date of Patent: Jul. 4, 2017

(54) FUEL CELL

(71) Applicant: HONDA MOTOR CO., LTD., Tokyo (JP)

(72) Inventors: Shuhei Goto, Wako (JP); Go Morimoto, Wako (JP); Kentaro Ishida, Wako (JP); Keisuke Ando, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 14/724,819

(22) Filed: May 29, 2015

(65) Prior Publication Data

US 2015/0349355 A1    Dec. 3, 2015

(30) Foreign Application Priority Data

May 30, 2014  (JP) ................. 2014-112125

(51) Int. Cl.
 *H01M 8/24* (2016.01)
 *H01M 8/0276* (2016.01)
 *H01M 8/1018* (2016.01)

(52) U.S. Cl.
 CPC .. *H01M 8/0276* (2013.01); *H01M 2008/1095* (2013.01); *H01M 2250/20* (2013.01); *Y02T 90/32* (2013.01)

(58) Field of Classification Search
 CPC ........... H01M 8/0278; H01M 2250/20; H01M 2008/1095
 USPC .......................................................... 429/60
 See application file for complete search history.

(56) References Cited

U.S. PATENT DOCUMENTS

| 6,602,632 | B2 | 8/2003 | Wakahoi et al. |
| 7,008,584 | B2 | 3/2006 | Inoue et al. |
| 2004/0137307 | A1 | 7/2004 | Okonogi et al. |
| 2015/0050577 | A1* | 2/2015 | Numao ............... H01M 8/2485 429/460 |

FOREIGN PATENT DOCUMENTS

| JP | 2007-042510 | 2/2007 |
| JP | 2011-003485 | 1/2011 |

* cited by examiner

*Primary Examiner* — Jayne Mershon
(74) *Attorney, Agent, or Firm* — Mori & Ward, LLP

(57) ABSTRACT

A fuel cell includes a membrane electrode assembly, a separator, and a sealing member. The sealing member is provided on a separator surface and includes a base seal portion, a protruding seal portion, a first recessed portion, and a second recessed portion. The protruding seal portion protrudes from the base seal portion in a stacking direction so as to block leakage of at least one of a fuel gas, an oxidant gas, and a coolant which flow along the separator surface. The first recessed portion is disposed on a first side of the protruding seal portion. The second recessed portion is disposed on a second side of the protruding seal portion opposite to the first recessed portion. The first recessed portion and the second recessed portion have a height in the stacking direction smaller than a height of the base seal portion in the stacking direction.

5 Claims, 5 Drawing Sheets

BACKGROUND ART

FUEL CELL

CROSS-REFERENCE TO RELATED APPLICATIONS

The present application claims priority under 35 U.S.C. §119 to Japanese Patent Application No. 2014-112125, filed May 30, 2014, entitled "Fuel Cell." The contents of this application are incorporated herein by reference in their entirety.

BACKGROUND

1. Field

The present disclosure relates to a fuel cell.

2. Description of the Related Art

For example, a solid polymer electrolyte fuel cell includes a membrane electrode assembly (MEA) including an electrolyte membrane, an anode electrode, and a cathode electrode. The electrolyte membrane is a solid polymer ion-exchange membrane. The anode electrode is disposed on one side of the electrolyte membrane, and the cathode electrode is disposed on the other side of the electrolyte membrane. The MEA and separators, sandwiching the MEA therebetween, constitute a power generation cell. A fuel cell stack is formed by stacking a predetermined number of such power generation cells, and the fuel cell stack is used, for example, as an automobile fuel cell stack installed in a fuel cell electric automobile.

In a fuel cell, it is necessary to gas-tightly hold a fuel gas and an oxidant gas in order to prevent a gas leak and the like and it is necessary to liquid-tightly hold a coolant in order to maintain a cooling function. For this purpose, various sealing structures are used.

For example, Japanese Unexamined Patent Application Publication No. 2007-42510 discloses a gasket for a fuel cell. The gasket includes a planar portion and a protruding portion, which stands on the planar portion and has a width smaller than that of the planar portion. At curved portions and branched portions of the gasket, the structure of an outer peripheral part of the protruding portion and the structure of an inner peripheral part of the protruding portion differ from each other.

The inner peripheral part is structured so that it can be deformed with a stress concentration smaller than that for deforming the outer peripheral part. It is described that, with such a structure, stress concentration on the curved portions and the branched portions can be suppressed when a fastening load or the like is applied to the gasket.

As illustrated in FIG. 5, for example, the gasket includes a planar portion 1a and a protruding portion 1b, which stands on the planar portion 1a and has a width smaller than that of the planar portion 1a. Excluding the curved portions and the branched portions of the gasket, the protruding portion 1b is symmetric about a center line 2 of the gasket in the width direction. In the curved portions and the branched portions of the gasket, the protruding portion 1b is asymmetric about the center line 2.

Regarding a gasket of this type, it is desirable to reduce the height h of the protruding portion 1b so that the size of the entirety of a fuel cell can be reduced.

SUMMARY

According to one aspect of the present invention, a fuel cell includes a membrane electrode assembly and a separator. The membrane electrode assembly includes an electrolyte membrane and electrodes sandwiching the electrode membrane therebetween. The separator is stacked on the membrane electrode assembly and includes a sealing member. The sealing member includes a base seal portion having a planar shape extending along a separator surface and a protruding seal portion protruding from the base seal portion to a large height in a stacking direction of the separator. The protruding seal portion blocks leakage of at least one of a fuel gas, an oxidant gas, and a coolant. The sealing member includes a recessed portion disposed on each of two sides of the protruding seal portion. The recessed portion has a height in the stacking direction smaller than that of the base seal portion.

According to another aspect of the present invention, a fuel cell includes a membrane electrode assembly, a separator, and a sealing member. The membrane electrode assembly includes a first electrode, a second electrode, and an electrolyte membrane sandwiched between the first electrode and the second electrode in a stacking direction. The separator is stacked on the membrane electrode assembly in the stacking direction and has a separator surface. The sealing member is provided on the separator surface and includes a base seal portion, a protruding seal portion, a first recessed portion, and a second recessed portion. The base seal portion has a planar shape extending along the separator surface. The protruding seal portion protrudes from the base seal portion in the stacking direction so as to block leakage of at least one of a fuel gas, an oxidant gas, and a coolant which flow along the separator surface. The first recessed portion is disposed on a first side of the protruding seal portion. The second recessed portion is disposed on a second side of the protruding seal portion opposite to the first recessed portion. The first recessed portion and the second recessed portion have a height in the stacking direction smaller than a height of the base seal portion in the stacking direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
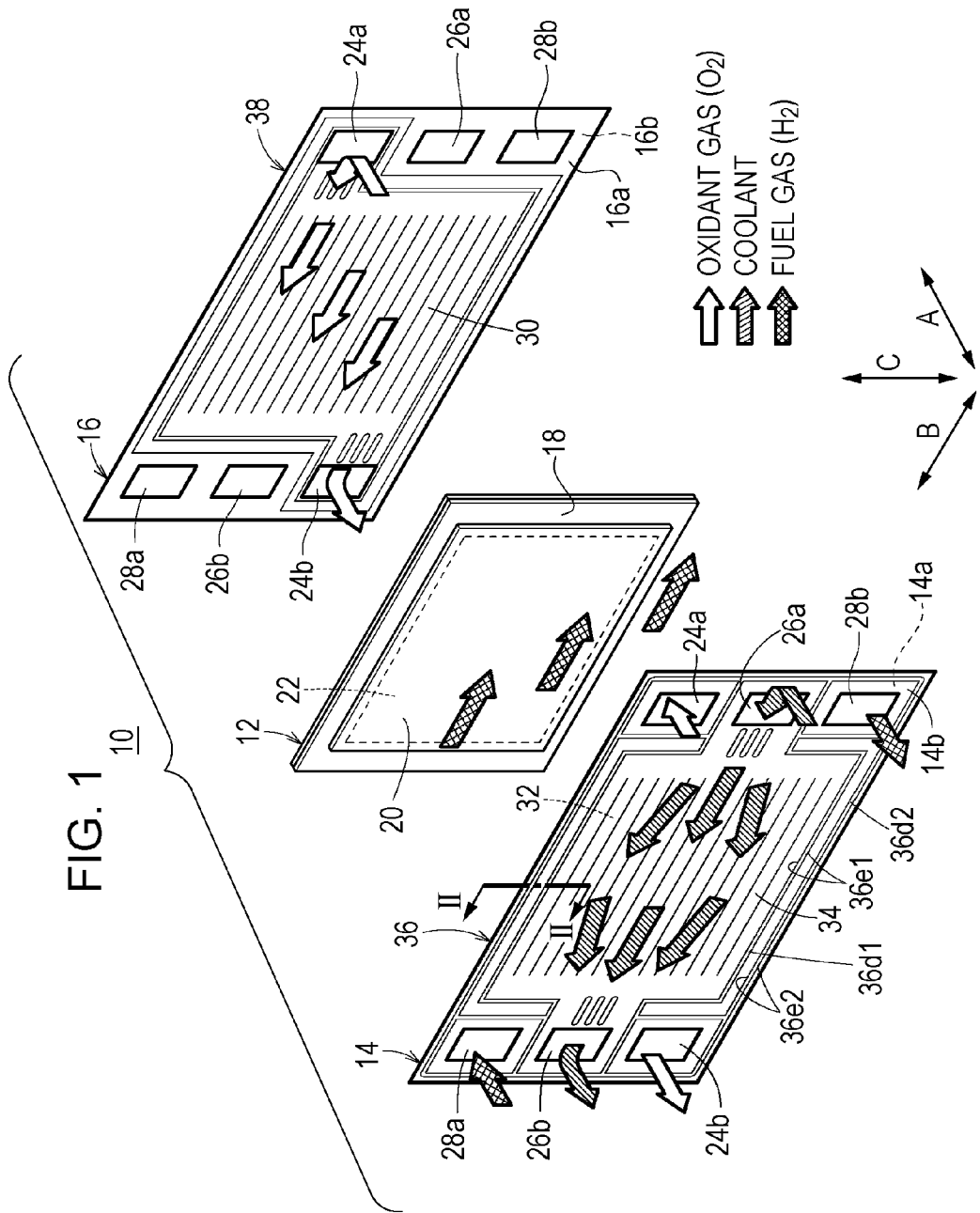
FIG. 1 is an exploded perspective view of a fuel cell according to an embodiment of the present disclosure.

The embodiments will now be described with reference to the accompanying drawings, wherein like reference numerals designate corresponding or identical elements throughout the various drawings.

Figure 2:
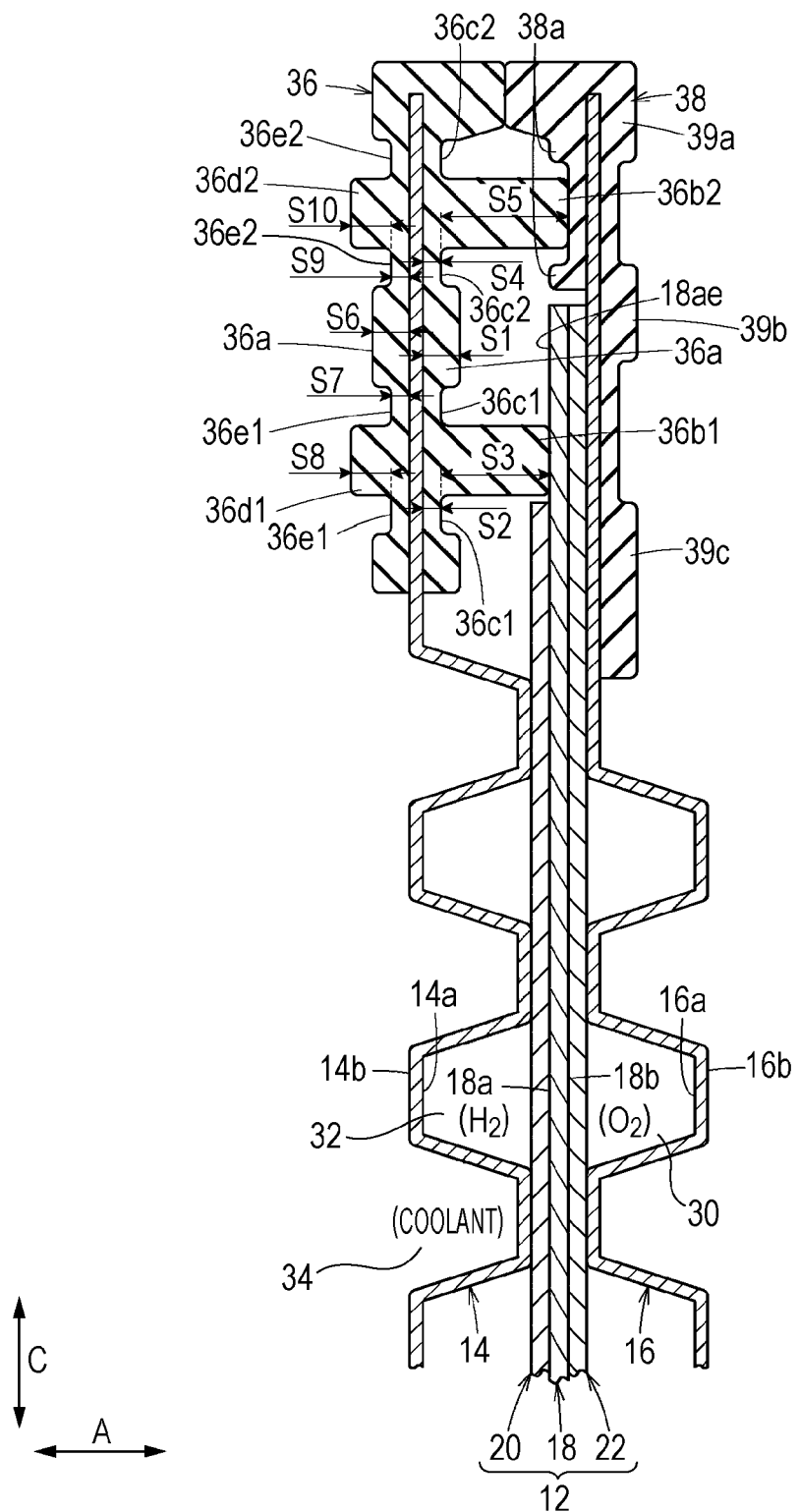
FIG. 2 is a sectional view of the fuel cell taken along line II-II of FIG. 1.

As illustrated in FIGS. 1 and 2, a plurality of fuel cells 10 according to an embodiment of the present disclosure are stacked in the direction of arrow A (for example, a horizontal direction) and used, for example, as an automobile fuel cell stack.

Each of the fuel cells 10 includes a membrane electrode assembly 12, and an anode separator 14 and a cathode separator 16 sandwiching the membrane electrode assembly 12 therebetween. Each of the anode separator 14 and the cathode separator 16 is, for example, a metal separator made from a metal plate, such as a steel plate, a stainless steel plate, an aluminum plate, and a galvanized steel plate. Alternatively, the anode separator 14 and the cathode separator 16 may be carbon separators.

The membrane electrode assembly 12 includes a solid polymer electrolyte membrane 18, and an anode electrode 20 and a cathode electrode 22 sandwiching the solid polymer electrolyte membrane 18 therebetween. The solid polymer electrolyte membrane 18 is, for example, a thin film made of a perfluorosulfonic acid copolymer and soaked with water. Instead of a fluoropolymer electrolyte membrane, a hydrocarbon (HC) electrolyte membrane may be used as the solid polymer electrolyte membrane 18.

The anode electrode 20 has a size in plan view smaller than that of each of the cathode electrode 22 and the solid polymer electrolyte membrane 18. The cathode electrode 22 may have a size in plan view smaller than that of the anode electrode 20. The cathode electrode 22 and the anode electrode 20 may have the same size in plan view.

As illustrated in FIG. 2, the anode electrode 20 is disposed on a surface 18a of the solid polymer electrolyte membrane 18. The cathode electrode 22 is disposed on a surface 18b of the solid polymer electrolyte membrane 18.

Each of the anode electrode 20 and the cathode electrode 22 includes an electrode catalyst layer and a gas diffusion layer disposed on the electrode catalyst layer. The electrode catalyst layer is made of a material including porous carbon particles whose surfaces support a platinum alloy. The gas diffusion layer is made of carbon paper or the like. The electrode catalyst layer is formed by uniformly coating a surface of the gas diffusion layer or a surface of the solid polymer electrolyte membrane 18 with the above material.

As illustrated in FIG. 1, an oxidant gas inlet manifold 24a, a coolant inlet manifold 26a, and a fuel gas outlet manifold 28b are formed in the fuel cells 10 so as to extend in the direction of arrow A, which is the stacking direction, through one end portion of each of the fuel cells 10 in the direction of arrow B (horizontal direction in FIG. 1). An oxidant gas, such as an oxygen-containing gas, is supplied through the oxidant gas inlet manifold 24a. A coolant is supplied through the coolant inlet manifold 26a. A fuel gas, such as a hydrogen-containing gas, is discharged through the fuel gas outlet manifold 28b. The oxidant gas inlet manifold 24a, the coolant inlet manifold 26a, and the fuel gas outlet manifold 28b are arranged in the direction of arrow C (vertical direction).

A fuel gas inlet manifold 28a, a coolant outlet manifold 26b, and an oxidant gas outlet manifold 24b are formed in the fuel cells 10 so as to extend in the direction of arrow A through the other end portion of each of the fuel cells 10 in the direction of arrow B. The fuel gas is supplied through the fuel gas inlet manifold 28a. The coolant is discharged through the coolant outlet manifold 26b. The oxidant gas is discharged through the oxidant gas outlet manifold 24b. The fuel gas inlet manifold 28a, the coolant outlet manifold 26b, and the oxidant gas outlet manifold 24b are arranged in the direction of arrow C.

An oxidant gas channel 30, which is connected to the oxidant gas inlet manifold 24a and the oxidant gas outlet manifold 24b, is formed on a surface 16a of the cathode separator 16 facing the membrane electrode assembly 12.

Figure 3:
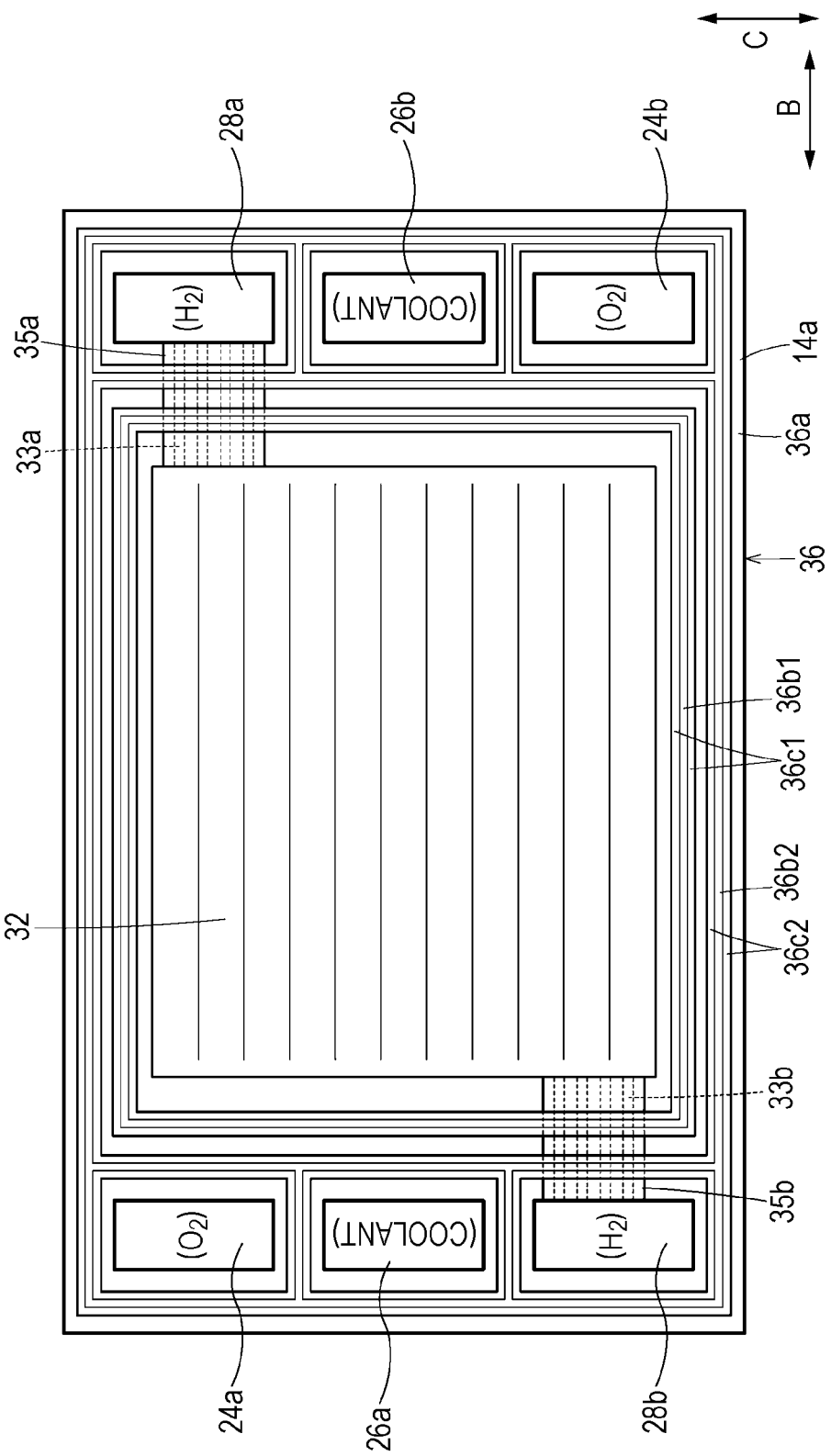
FIG. 3 is a plan view of an anode separator included in the fuel cell.

As illustrated in FIG. 3, a fuel gas channel 32, which is connected to the fuel gas inlet manifold 28a and the fuel gas outlet manifold 28b, is formed on a surface 14a of the anode separator 14 facing the membrane electrode assembly 12. The fuel gas channel 32 is made by forming the metal separator so as to have an corrugated cross sectional shape. The fuel gas inlet manifold 28a and the fuel gas channel 32 are connected to each other through a plurality of inlet connection channels 33a. The fuel gas outlet manifold 28b and the fuel gas channel 32 are connected to each other through a plurality of outlet connection channels 33b. The inlet connection channels 33a and the outlet connection channels 33b are covered with a cover 35a and a cover 35b, respectively.

Referring to FIG. 1, a coolant channel 34, through which the coolant inlet manifold 26a is connected to the coolant outlet manifold 26b, is formed between a surface 14b of the anode separator 14 of the fuel cell 10 and a surface 16b of the cathode separator 16 of an adjacent fuel cell 10.

As illustrated in FIGS. 1 and 2, a first sealing member 36 is integrally formed with (or independently formed on) the surfaces 14a and 14b of the anode separator 14 so as to surround the outer peripheral end portion of the anode separator 14. A second sealing member 38 is integrally formed with (or independently formed on) the surfaces 16a and 16b of the cathode separator 16 so as to surround the outer peripheral end portion of the cathode separator 16.

Each of the first sealing member 36 and the second sealing member 38 is made of an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

As illustrated in FIGS. 2 and 3, the first sealing member 36 includes a base seal portion 36a, which has a planar shape extending along the outer peripheries of the surfaces 14a and 14b of the anode separator 14. The base seal portion 36a is integrated with the surfaces 14a and 14b. On the surface 14a, an inner protruding seal portion 36b1 and an outer protruding seal portion 36b2 each protrude from the base seal portion 36a to a large height in the direction in which the anode separator 14 is stacked. Each of the inner protruding seal portion 36b1 and the outer protruding seal portion 36b2 has a substantially rectangular or substantially square cross-sectional shape. As can be seen from FIG. 2, a curved R-shaped portion is formed between the base seal portion 36a and each of parts of the inner protruding seal portion 36b1 and the outer protruding seal portion 36b2 from which these seal portions 36b1 and 36b2 stand on the base seal portion 36a.

As illustrated in FIG. 3, the inner protruding seal portion 36b1 surrounds the fuel gas channel 32 so as to block leakage of the fuel gas. The outer protruding seal portion 36b2 surrounds the oxidant gas inlet manifold 24a, the oxidant gas outlet manifold 24b, the coolant inlet manifold 26a, the coolant outlet manifold 26b, the fuel gas inlet manifold 28a, and the fuel gas outlet manifold 28b.

As illustrated in FIG. 2, the inner protruding seal portion 36b1 is in direct contact with an outer peripheral end portion 18ae of the solid polymer electrolyte membrane 18 of the membrane electrode assembly 12. The outer peripheral end portion 18ae is a part of the solid polymer electrolyte membrane 18 that surrounds an outer peripheral portion of the solid polymer electrolyte membrane 18, extends outward from the outer periphery of the anode electrode 20, and is exposed to the outside. The outer protruding seal portion 36b2 is located outward from the outer peripheral end portion 18ae of the solid polymer electrolyte membrane 18 and is in direct contact with the second sealing member 38. A part of the second sealing member 38 with which the outer protruding seal portion 36b2 is contact is a planar part that has a height smaller than that of each of adjacent base seal portions 38a (described below) of the second sealing member 38.

The first sealing member 36 includes inner recessed portions 36c1, which are disposed on both sides (at both ends in the width direction) of the inner protruding seal portion 36b1. Each of the inner recessed portions 36c1 has a height in the stacking direction smaller than that of the base seal portion 36a. The heights of the inner recessed portions 36c1, which are on both sides of the inner protruding seal portion 36b1, are the same as each other. The height S2 of the inner recessed portions 36c1 is smaller than the height S1 of the base seal portion 36a (S1>S2). The entirety of the inner protruding seal portion 36b1 has a height S3.

The first sealing member 36 includes outer recessed portions 36c2, which are disposed on both sides (at both ends in the width direction) of the outer protruding seal portion 36b2. Each of the outer recessed portions 36c2 has a height in the stacking direction smaller than that of the base seal portion 36a. The heights of the outer recessed portions 36c2, which are on both sides of the outer protruding seal portion 36b2, are the same as each other. The height S4 of the outer recessed portions 36c2 is smaller than the height S1 of the base seal portion 36a (S1>S4). The entirety of the outer protruding seal portion 36b2 has a height S5. The height S2 may be the same as the height S4.

As illustrated in FIGS. 1 and 2, on the surface 14b, an inner protruding seal portion 36d1 and an outer protruding seal portion 36d2 each protrude from the base seal portion 36a to a large height in the direction in which the anode separator 14 is stacked. Each of the inner protruding seal portion 36d1 and the outer protruding seal portion 36d2 has a substantially rectangular or substantially square cross-sectional shape. In this case, the outer protruding seal portion 36b2 and the outer protruding seal portion 36d2 are disposed at the same position (at the same height position in FIG. 2), with the anode separator 14 therebetween. The inner protruding seal portion 36b1 and the inner protruding seal portion 36d1 are disposed at the same position (at the same height position in FIG. 2), with the anode separator 14 therebetween. As can be seen from FIG. 2, a curved R-shaped portion is formed between the base seal portion 36a and each of parts of the inner protruding seal portion 36d1 and the outer protruding seal portion 36d2 from which these seal portions 36d1 and 36d2 stand on the base seal portion 36a.

As illustrated in FIG. 1, the inner protruding seal portion 36d1 surrounds the coolant channel 34, the coolant inlet manifold 26a, and the coolant outlet manifold 26b so as to block leakage of the coolant. The outer protruding seal portion 36d2 surrounds the oxidant gas inlet manifold 24a, the oxidant gas outlet manifold 24b, the fuel gas inlet manifold 28a, and the fuel gas outlet manifold 28b.

The inner protruding seal portion 36d1 and the outer protruding seal portion 36d2 of the fuel cell 10 are in direct contact with the second sealing member 38 of the cathode separator 16 of an adjacent fuel cell 10 and form the coolant channel 34. In this case, the outer protruding seal portion 36d2 and the inner protruding seal portion 36d1 are respectively in contact with a contact surface between base seal portions 39a and 39b and a contact surface between the base seal portion 39b and a base seal portion 39c. The contact surfaces have a height smaller than that of the base seal portions 39a, 39b, and 39c, which protrude from the second sealing member 38.

As illustrated in FIG. 2, the first sealing member 36 includes inner recessed portions 36e1, which are disposed on both sides (at both ends in the width direction) of the inner protruding seal portion 36d1. Each of the inner recessed portions 36e1 has a height in the stacking direction smaller than that of the base seal portion 36a. The heights of the inner recessed portions 36e1, which are on both sides of the inner protruding seal portion 36d1, are the same as each other. The height S7 of each of the inner recessed portions 36e1 is smaller than the height S6 (which may be the same as S1) of the base seal portion 36a (S6>S7). The entirety of the inner protruding seal portion 36d1 has a height S8.

The first sealing member 36 includes outer recessed portions 36e2, which are disposed on both sides (at both ends in the width direction) of the outer protruding seal portion 36d2. Each of the outer recessed portions 36e2 has a height in the stacking direction smaller than that of the base seal portion 36a. The heights of the outer recessed portions 36e2, which are on both sides of the outer protruding seal portion 36d2, are the same as each other. The height S9 of the outer recessed portions 36e2 is smaller than the height S6 of the base seal portion 36a (S6>S9). The entirety of the outer protruding seal portion 36d2 has a height S10. The height S7 may be the same as the height S9.

The second sealing member 38 includes the base seal portions 38a and 39a to 39c, which have planar shapes extending along the outer peripheries of the surfaces 16a and 16b of the cathode separator 16 and which are integrated with the surfaces 16a and 16b. That is, the second sealing member 38 includes the base seal portions 38a on both sides of the outer protruding seal portion 36b2 of the first sealing member 36 and further includes the base seal portion 39a, 39b, and, 39c, which extend along the surface 16b and each protrude to a predetermined height. A surface between the base seal portions 39a and 39b and a surface between the base seal portions 39b and 39c each serve as a contact surface.

Hereinafter, an operation of the fuel cell 10 having the above structure will be described.

As illustrated in FIG. 1, first, an oxidant gas, such as an oxygen-containing gas, is supplied to the oxidant gas inlet manifold 24a. A fuel gas, such as a hydrogen-containing gas, is supplied to the fuel gas inlet manifold 28a. A coolant, such as pure water, ethylene glycol, or oil, is supplied to the coolant inlet manifold 26a.

The oxidant gas is introduced from the oxidant gas inlet manifold 24a to the oxidant gas channel 30 of the cathode separator 16, flows in the direction of arrow B, and is supplied to the cathode electrode 22 of the membrane electrode assembly 12 (see FIG. 1).

Referring to FIG. 3, the fuel gas is supplied from the fuel gas inlet manifold 28a to the fuel gas channel 32 through the inlet connection channel 33a of the anode separator 14. The fuel gas flows along the fuel gas channel 32 in the direction of arrow B and is supplied to the anode electrode 20 of the membrane electrode assembly 12 (see FIG. 1).

Accordingly, in the membrane electrode assembly 12, the fuel gas supplied to the anode electrode 20 and the oxidant gas supplied to the cathode electrode 22 are consumed in electrochemical reactions in the electrode catalyst layers, thus generating electric power.

Next, the oxidant gas, which has been supplied to the cathode electrode 22 and consumed, is discharged along the oxidant gas outlet manifold 24b in the direction of arrow A.

Likewise, referring to FIG. 3, the fuel gas, which has been supplied to the anode electrode 20 and consumed, is discharged from the outlet connection channel 33b along the fuel gas outlet manifold 28b in the direction of arrow A.

The coolant, which has been supplied to the coolant inlet manifold 26a, is introduced into the coolant channel 34 between the anode separator 14 and the cathode separator 16 and flows in the direction of arrow B. The coolant cools the membrane electrode assembly 12 and is discharged from the coolant outlet manifold 26b.

In the present embodiment, as illustrated in FIGS. 2 and 3, the outer protruding seal portion 36b2 protrudes from the base seal portion 36a of the first sealing member 36. The outer recessed portions 36c2, each having a height in the stacking direction smaller than that of the base seal portion 36a, are disposed on both sides of the outer protruding seal portion 36b2. To be specific, as illustrated in FIG. 2, the height S4 of the outer recessed portions 36c2 is smaller than the height S1 of the base seal portion 36a (S1>S4).

Therefore, the height S5 of the entirety of the outer protruding seal portion 36b2 is increased to the sum of the height from the base seal portion 36a to the top end of the outer protruding seal portion 36b2 and the depth (S1−S4) from the base seal portion 36a to the bottom surface of the outer recessed portion 36c2.

Figure 4:
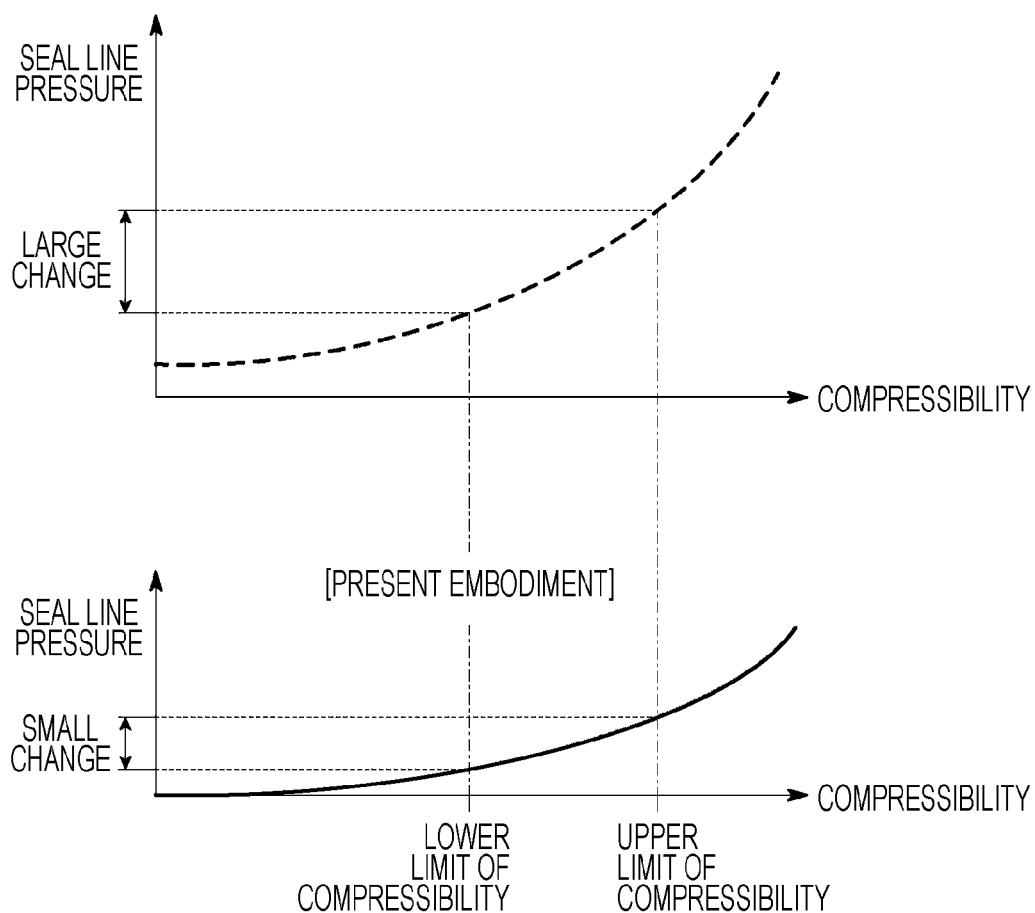
FIG. 4 illustrates the relationship between compressibility and seal line pressure in a comparative example and the present embodiment.
Figure 5:
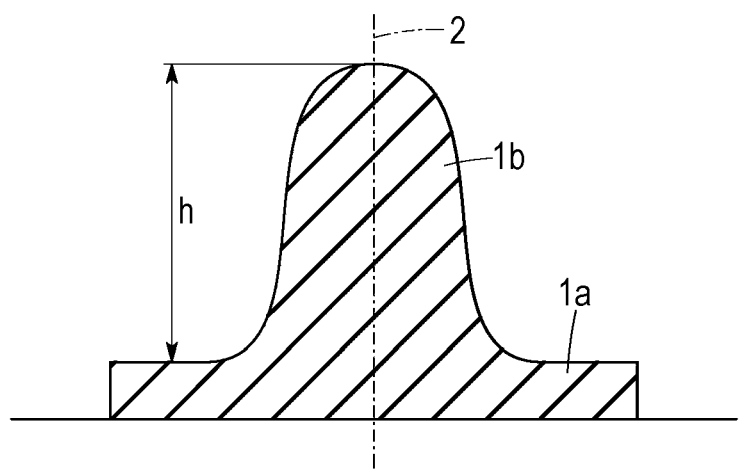
FIG. 5 illustrates a gasket disclosed in Japanese Unexamined Patent Application Publication No. 2007-42510.

Here, the relationship between the compressibility and the seal line pressure of an outer protruding seal portion (comparative example) that does not have the outer recessed portions 36c2 and the relationship between the compressibility and the seal line pressure of the outer protruding seal portion 36b2 (the present embodiment), which has the outer recessed portions 36c2, are compared with each other. FIG. 4 shows the results. In the comparative example, the height of the outer protruding seal portion is the distance from the surface of the base seal portion to the top end of the outer protruding seal portion. Accordingly, the height of the outer protruding seal portion is not sufficiently large, and the ratio of a change of the seal line pressure to a change of the compressibility due to a dimensional tolerance or the like is large.

In contrast, in the present embodiment, the height S5 of the entirety of the outer protruding seal portion 36b2 is the distance from the bottom surface of the outer recessed portion 36c2 to the top end of the outer protruding seal portion 36b2. Thus, the elastic modulus (Young's modulus) of the outer protruding seal portion 36b2 is low, and therefore the ratio of a change of the seal line pressure to a change of the compressibility is low.

Therefore, in the present embodiment, the effective height of the outer protruding seal portion 36b2 can be increased without increasing the height of the entirety of the first sealing member 36. Accordingly, the first sealing member 36 provides an advantage in that the first sealing member 36 can maintain a desirable salability against a compressive load and the thickness of the first sealing member 36 can be reduced so that the dimension of the entirety of the fuel cell 10 in the stacking direction can be effectively reduced.

Each of the inner protruding seal portions 36b1 and 36d1, and the outer protruding seal portion 36d2 provides an advantage the same as that of the outer protruding seal portion 36b2.

In the present embodiment, the fuel cell 10 includes one membrane electrode assembly (MEA) 12 sandwiched between the anode separator 14 and the cathode separator 16. However, this is not a limitation. For example, the fuel cell 10 may include two MEAs and three or more separators, and the separators and the MEAs may be stacked alternately.

According to the present disclosure, a fuel cell includes a membrane electrode assembly including an electrolyte membrane and electrodes sandwiching the electrode membrane therebetween; and a separator stacked on the membrane electrode assembly and including a sealing member. The sealing member includes a base seal portion having a planar shape extending along a separator surface. The sealing member includes a protruding seal portion protruding from the base seal portion to a large height in a stacking direction of the separator, the protruding seal portion blocking leakage of at least one of a fuel gas, an oxidant gas, and a coolant. The sealing member includes a recessed portion disposed on each of two sides of the protruding seal portion, the recessed portion having a height in the stacking direction smaller than that of the base seal portion.

Preferably, a height of a base seal portion with which a top end of the protruding seal portion is in contact is smaller than that of an adjacent base seal portion.

According to the present disclosure, the protruding seal portion protrudes from the base seal portion; and the recessed portion, which has a height in the stacking direction smaller than that of the base seal portion, is disposed on each of two sides of the protruding seal portion. Therefore, the height of the entirety of the protruding seal portion is increased to the sum of the height from the base seal portion to the top end of the protruding seal portion and the depth from the base seal portion to the bottom surface of the recessed portion.

Accordingly, the effective height of the protruding seal portion can be increased without increasing the height of the entirety of the sealing member. Thus, the sealing member provides an advantage in that the sealing member can maintain desirable sealability against a compressive load and the thickness of the sealing member can be reduced so that the dimension of the entirety of the fuel cell in the stacking direction can be effectively reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
   a membrane electrode assembly including an electrolyte membrane and electrodes sandwiching the electrode membrane therebetween; and
   a separator stacked on the membrane electrode assembly and including a sealing member,
   wherein the sealing member includes
      a base seal portion having a planar shape extending along a separator surface,
      a protruding seal portion protruding from the base seal portion to a large height in a stacking direction of the separator, the protruding seal portion blocking leakage of at least one of a fuel gas, an oxidant gas, and a coolant, and
      a recessed portion disposed on each of two sides of the protruding seal portion, the recessed portion having a height in the stacking direction smaller than that of the base seal portion.

2. The fuel cell according to claim 1,
   wherein a height of a base seal portion with which a top end of the protruding seal portion is in contact is smaller than that of an adjacent base seal portion.

3. A fuel cell comprising:
   a membrane electrode assembly comprising:
      a first electrode;

a second electrode; and an electrolyte membrane sandwiched between the first electrode and the second electrode in a stacking direction;

a separator stacked on the membrane electrode assembly in the stacking direction and having a separator surface; and a sealing member provided on the separator surface and comprising:

a base seal portion having a planar shape extending along the separator surface;

a protruding seal portion protruding from the base seal portion in the stacking direction so as to block leakage of at least one of a fuel gas, an oxidant gas, and a coolant which flow along the separator surface;

a first recessed portion disposed on a first side of the protruding seal portion; and a second recessed portion disposed on a second side of the protruding seal portion opposite to the first recessed portion, the first recessed portion and the second recessed portion having a height in the stacking direction smaller than a height of the base seal portion in the stacking direction.

4. The fuel cell according to claim 3, wherein a height of a base seal portion with which a top end of the protruding seal portion is in contact in the stacking direction is smaller than a height of an adjacent base seal portion in the stacking direction.

5. The fuel cell according to claim 3, further comprising:

a second separator stacked on the membrane electrode assembly in the stacking direction and having a second separator surface; and a second sealing member provided on the second separator surface and comprising:

a second base seal portion having a planar shape extending along the second separator surface; and a third recessed portion provided on the second base seal portion, wherein a top end of the protruding seal portion is in contact with the third recessed portion, and wherein a height of the third recessed portion in the stacking direction is smaller than a height of the second base seal portion in the stacking direction.

* * * * *